US012756464B2

(12) United States Patent
Subramaniam

(10) Patent No.: US 12,756,464 B2
(45) Date of Patent: Oct. 6, 2026

(54) ELECTRONIC DEVICES EMPLOYING OPTICAL COMMUNICATIONS

(71) Applicant: Hewlett-Packard Development Company, L.P., Spring, TX (US)

(72) Inventor: Ravi Shankar Subramaniam, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 310 days.

(21) Appl. No.: 18/557,391

(22) PCT Filed: Apr. 30, 2021

(86) PCT No.: PCT/US2021/030345
§ 371 (c)(1),
(2) Date: Oct. 26, 2023

(87) PCT Pub. No.: WO2022/231631
PCT Pub. Date: Nov. 3, 2022

(65) Prior Publication Data

US 2024/0235676 A1 Jul. 11, 2024

(51) Int. Cl.

*H04B 10/112* (2013.01)
*H02J 50/10* (2016.01)
*H02J 50/90* (2016.01)
*H04B 10/50* (2013.01)

(52) U.S. Cl.

CPC ............ *H04B 10/112* (2013.01); *H02J 50/10* (2016.02); *H02J 50/90* (2016.02); *H04B 10/503* (2013.01)

(58) Field of Classification Search

CPC ..... H04B 10/112; H04B 10/503; H02J 50/90; H02J 50/10
See application file for complete search history.

(56) References Cited

U.S. PATENT DOCUMENTS 7,805,080 B2 * 9/2010 Wang .................. H04B 10/803 398/131
7,835,647 B2 * 11/2010 Beausoleil .......... H04B 10/803 398/131
8,275,266 B2 * 9/2012 Tan ..................... H04B 10/803 398/118
10,097,264 B2 * 10/2018 Venugopalan Nair Jalakumari .... H04B 10/1143

(Continued)

FOREIGN PATENT DOCUMENTS

WO 2020/240016 A1 12/2020

*Primary Examiner* — Kenneth N Vanderpuye
*Assistant Examiner* — Asif Shameem
(74) *Attorney, Agent, or Firm* — Quarles & Brady LLP

(57) ABSTRACT

An electronic device employing optical communications including a light cell array, each light cell individually operable to output a controllable collimated light beam, the light beams of the light cell array to form a data encoded optical output signal to transmit to a destination electronic device. A photocell array receives a data encoded optical input signal from the destination electronic device, each photocell to provide an output signal representative of an amount of energy received from the optical input signal. A controller measures an overlap of the optical input signal with the photocell array based on the output signals of the array of photocells, and adjusts a position of the photocell array based on the measured overlap to align the photocell array with the with the optical input signal.

18 Claims, 11 Drawing Sheets

(56) References Cited

U.S. PATENT DOCUMENTS

| | | | | |
|---|---|---|---|---|
| 10,498,455 | B2 * | 12/2019 | Maret .................. | H04B 10/502 |
| 2017/0090134 | A1 * | 3/2017 | Williams ................. | H04B 5/79 |
| 2018/0007045 | A1 * | 1/2018 | Akhavain Mohammadi ............... | H04B 10/516 |
| 2018/0302159 | A1 * | 10/2018 | Ritchie .................. | H04B 10/11 |

* cited by examiner

ELECTRONIC DEVICES EMPLOYING OPTICAL COMMUNICATIONS

BACKGROUND

Connectivity between electronic devices continues to grow at a rapid pace, particularly as the Internet of Things continues to evolve. Currently, wireless communication between electronic devices, both portable and stationary devices, depends primarily on radio communications.

DETAILED DESCRIPTION

Figure 1:
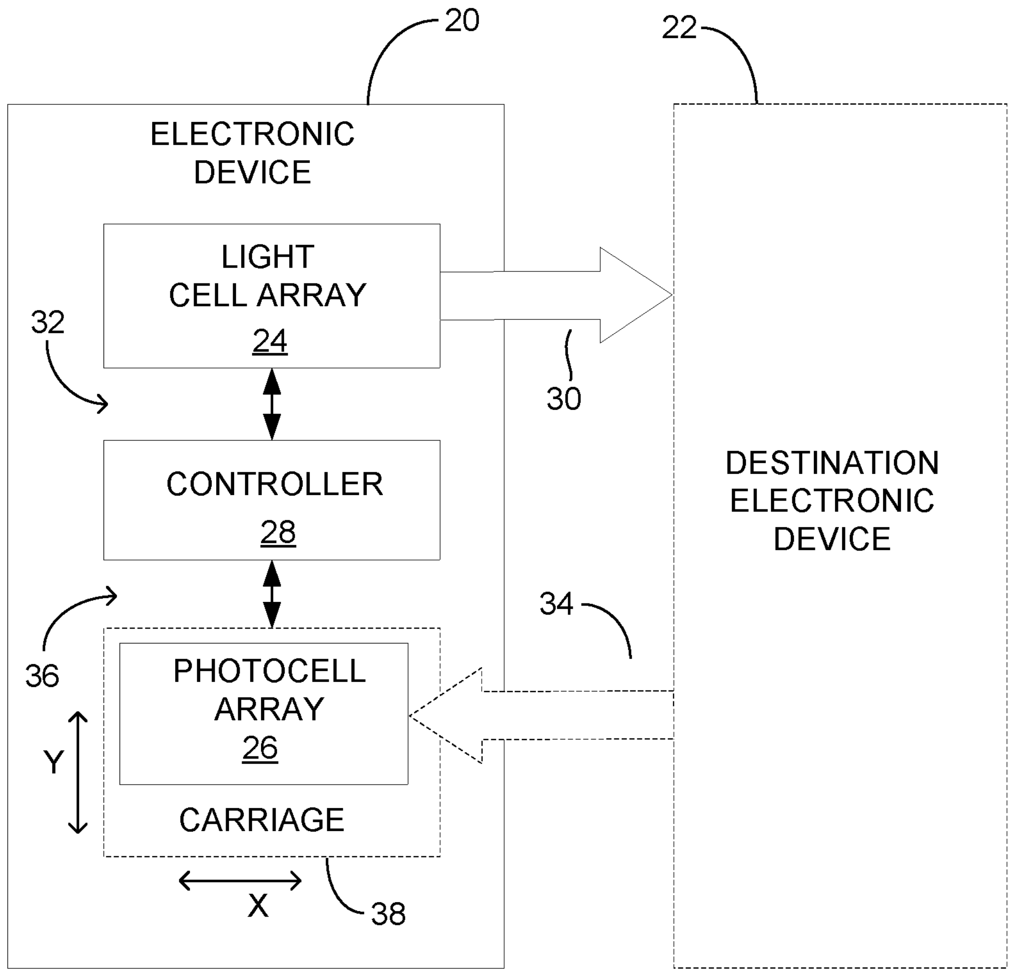
FIG. 1 is a block and schematic diagram generally illustrating an electronic device including an optical communication system, in accordance with the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Wireless communication between electronic devices, both portable and stationary electronic devices, depends primarily on radio communications (e.g., WiFi, Bluetooth). While effective, radio based communications lack the data bandwidth of wired communications and may create spectrum congestion leading to communication interference with nearby electronic devices (e.g., insufficient spacing between channels and band congestion as more devices operate in proximity to one another). Radio based communications are also susceptible to eavesdropping by malicious parties, thereby requiring very robust cryptographic security solutions to maintain privacy. Additionally, radio based communications may be adversely impacted by magnetic fields and, as result, require antennae to be disposed in areas free of metal interference. Such space is often limited, particularly in portable electronic devices, and may lead to sub-optimal antennae design, placement, and performance.

According to examples of the present disclosure, an optical communication system is described which provides wireless optical communication between electronic devices. In examples, the system employs an array of light cells providing controllable collimated light beams (e.g., vertical cavity surface emitting laser (VCSEL) diodes) disposed on a first device (e.g., a laptop), and an array of photosensitive cells (e.g., single photon avalanche diodes (SPAD)) disposed on a second device (e.g., a laptop, docking station). In examples, each light cell of the array is operable to output a collimated light beam which is separately controllable to represent encoded data, where the light beams of the array form an optical output signal encoded with data to transmit to the array of photosensitive cells of the second device. In examples, based on an overlap of the optical output signal with the array of photosensitive cells, a relative position between the optical output signal and the array of photosensitive cells is adjusted to achieve alignment there between.

In examples, an optical communication system, in accordance with the present disclosure, may be implemented in both single-duplex and full-duplex configurations, and may be operated in both single- and multi-channel configurations. Additionally, any number of suitable data encoding schemes may be employed, including temporal encoding (e.g., a binary bit stream), spatial encoding schemes (e.g., a QR code), and a combination of both, for example.

As will be described in greater detail herein, an optical communication system, in accordance with the present disclosure, provides higher-bandwidth and lower-latency communication relative to traditional wireless communication employing radio frequency communication (e.g., Bluetooth, WiFi). Because optical communication is more difficult to be eavesdropped by malicious parties, the optical communication system disclosed herein also provides enhanced privacy and security relative to radio frequency communication. Further, the optical communication system described herein is not disrupted by magnetic fields, as are RF communications and, thus, can be employed in the presence of metal components and enables implementation in a variety of environments and device form factors.

FIG. 1 is a block and schematic diagram generally illustrating an electronic device 20 (i.e., a first electronic device) employing an optical communication system to optically communicate with a destination electronic device 22 (i.e., a second electronic device), in accordance with the present disclosure. Electronic device 20 may be any stationary or portable electronic device, such as a mobile phone device, tablet device, laptop device, desktop computer, peripheral input device, networking device, and a wearable device, for example. In one case, as described in greater detail below, electronic device 20 is implemented as a wireless docking station, including a wireless charging device (see FIG. 10).

In one example, electronic device 20 includes a light cell array 24, a photocell array 26, and a controller 28. In examples, each light cell of light cell array 24 is individually operable, such as by controller 28, to output a controllable collimated light beam, where the light beams of light cell array 24 form an optical output signal 30 encoded with data (i.e., a data encoded optical output signal) to transmit to destination device 22. In examples, as will be described in greater detail below, light cell array 24 may be a one-dimensional array (a 1×m array) or a two-dimensional array (an m×n array) of any suitable dimension (where m and n are integer values greater than 1).

In examples, controller 28 encodes optical output signal 30 with data by selectively modulating and/or controlling any number of suitable characteristics of visible or non-visible light beams emitted by the cells of light cell array 24 such as an amplitude, frequency, color, pulse width, and duty cycle, for example. In one example, controller 28 may apply any suitable voltage or current waveform to each light cell of light cell array 24 to modulate and/or control a suitable characteristic of its emitted light beam, where the applied waveform represents data to be encoded in optical output signal 30 for communication to destination device 22. In examples, light cell array 24 and controller 28 together represent a transmitter module 32 for transmitting optically encoded data via optical output signal 30 to destination device 22.

In examples, the cells of light cell array 24 may be of any suitable light source, such as a light-emitting diode, a micro-scale light-emitting diode, an infrared band laser, and ultraviolet band laser, for example. In one example, light cell array 24 is an array of vertical cavity surface emitting lasers (VCSEL). In examples, each light cell may have corresponding structure(s) to collimate and/or focus the emitted light (e.g., beam collimators, micro-lenses, waveguides, reflectors, polarizers, etc.). For simplicity of description, light cell array 24 is referred to below as laser array 24 (e.g., a VCSEL array).

In examples, photocell array 26 is to receive an optical input signal 34 encoded with data (i.e., a data encoded optical input signal) from destination electronic device 22. In examples, each photocell of photocell array 26 provides an output signal representative of an amount of energy received from optical input signal 34. In examples, as will be described in greater detail below, photocell array 26 and optical input signal 32 are aligned as precisely as possible with one another to optimize communication between electronic device 20 and destination electronic device 22. In examples, based on the output signals of the photocells of photocell array 26, controller 28 determines an overlap of optical input signal 34 with photocell array 26. In one case, based on the determined overlap, controller 28 adjusts a position of photocell array 26 to achieve optimal alignment of photocell array 26 with optical input signal 34. In examples, photocell array 26 and controller 28 together represent a receiver module 36 for receiving optically encoded data, such as via optical input signal 32 from destination device 22.

In some examples, in it is noted that "optimal" alignment may not represent full alignment between photocell array 26 and optical input signal 34. In such cases, a mode of communication (e.g., direct or scanning mode) may be selected, such as by controller 28, to optimize communication based on a partial overlap between photocell array 26 and optical input signal 34 (such as when operating in a full-duplex arrangement, for example).

In one example, electronic device 20 includes a moveable carriage 38 on which photocell array 26 is arranged. In examples, based on a measured overlap between photocell array 26 and optical input signal 34, controller 28 adjusts a position of moveable carriage 38 (e.g., a 2-dimensional position along x- and y-axes) to optimally align photocell array 26 with optical input signal 34. In examples, moveable carriage 38 may be a microelectromechanical (MEMs) device supported by elastic elements which may be controllably moved from a center position ("home" position) via any suitable actuation mechanism (such as a piezoelectric actuator, magnetoresistive actuator, and electromagnetic actuator, for example). In some examples, as described in great detail below, mechanical alignment features or elements may be employed to ensure a degree of alignment (i.e., a coarse alignment) between electronic device 20 and destination electronic device 22, where such mechanical elements may be integral to the electronic devices (e.g., détentes, pins, keyed elements, etc.) and/or may be a separate alignment element to which the electronic devices 20 and 22 selectively attach.

In examples, the photocells of photocell array 26 include any suitable photosensitive element or combination of photosensitive elements such as charge-coupled devices, semiconductor photodiodes, semiconductor photodetectors, avalanche diodes, and single photon avalanche diodes (SPAD), for example. For simplicity of description, photocell array 26 is referred to below as SPAD array 26 (i.e., an array of single photon avalanche diodes).

As described in greater detail below, an optical communication system, in accordance with the present disclosure, may be implemented and operated in single-duplex and full-duplex configurations, and may be configured for single and multi-channel communication.

Figure 2:
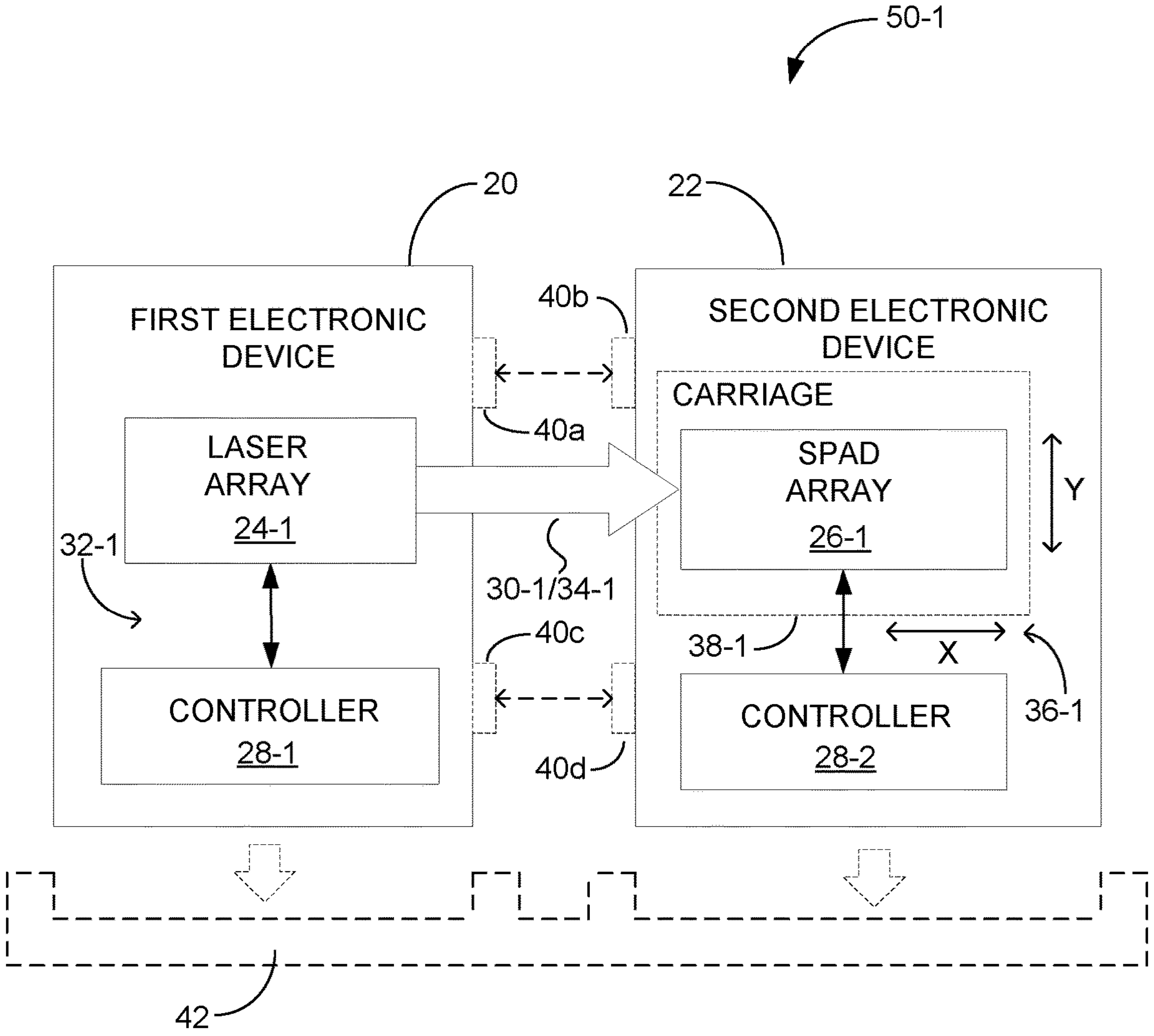
FIG. 2 is a block and schematic diagram generally illustrating a single duplex optical communication system, in accordance with the present disclosure.

FIG. 2 is a block and schematic diagram generally illustrating a single-duplex implementation of an optical communication system 50-1, in accordance with the present disclosure, which optically couples and provides single-duplex optical communication between first electronic device 20 and second electronic device 22. First electronic device 20 includes first laser array 24-1 and a first controller 28-1, which represent a first transmitter 32-1. Second electronic device 22 includes a first SPAD array 26-1 and a second controller 28-2, which together represent a first receiver 36-1. Together, first transmitter 32-1 of first electronic device 20 and first receiver 36-1 of second electronic device 22 form a single-duplex communication system, where first optical output signal 30-1 transmitted by first laser array 24-1 is received as first optical input signal 34-1 by first SPAD array 26-1.

As described above with respect to FIG. 1, in examples, first controller 28-1 individually controls the emitted light beam of each light cell of laser array 24-1 to provide first optical output signal 30-1 encoded with data to be transmitted to second electronic device 22. In examples, second controller 28-2 determines an overlap of first optical output signal 30-1 (i.e., first optical input signal 34-1) with first SPAD array 26-1 based on output signals of the cells of first SPAD array 26-1, and adjusts a position of first SPAD array 26-1 based on the overlap to align with first optical output signal 30-1 (i.e., first optical input signal 34-1). In one example, second controller 28-2 adjusts a position of a first moveable carriage 38-1 on which first SPAD array 26-1 is disposed to align the cells of first SPAD array 26-1 with first optical output signal 30-1.

In some examples, first and second electronic devices 20 and 22 may include a number of mechanical alignment elements 40 (illustrated in dashed lines as 40*a*-40*d*) which engage one another to mechanically couple first electronic device 20 with second electronic device 22 and provide a coarse alignment and at least a partial overlap of optical output signal 30-1 of laser array 24-1 with SPAD array 26-1. Mechanical alignment elements 40 may be magnetic elements, detents, pins, or any suitable alignment and/or interlock elements. In some examples, a mechanical alignment device 42 separate from first and second electronic device 20 and 22 may be employed which mechanically receives and aligns first and second electronic device 20 and 22 with one another to ensure at least a partial overlap of optical output signal 30-1 of laser array 24-1 with SPAD array 26-1. In examples, after coarse alignment is achieved via mechanical elements 40 and/or mechanical alignment device 42, final alignment between laser array 24-1 and SPAD array 26-1 is optimized via positional adjustment of SPAD array 26-1 by controller 28-2 based on an overlap as indicated by output signals the photocells of SPAD array 26-1.

Figure 3:
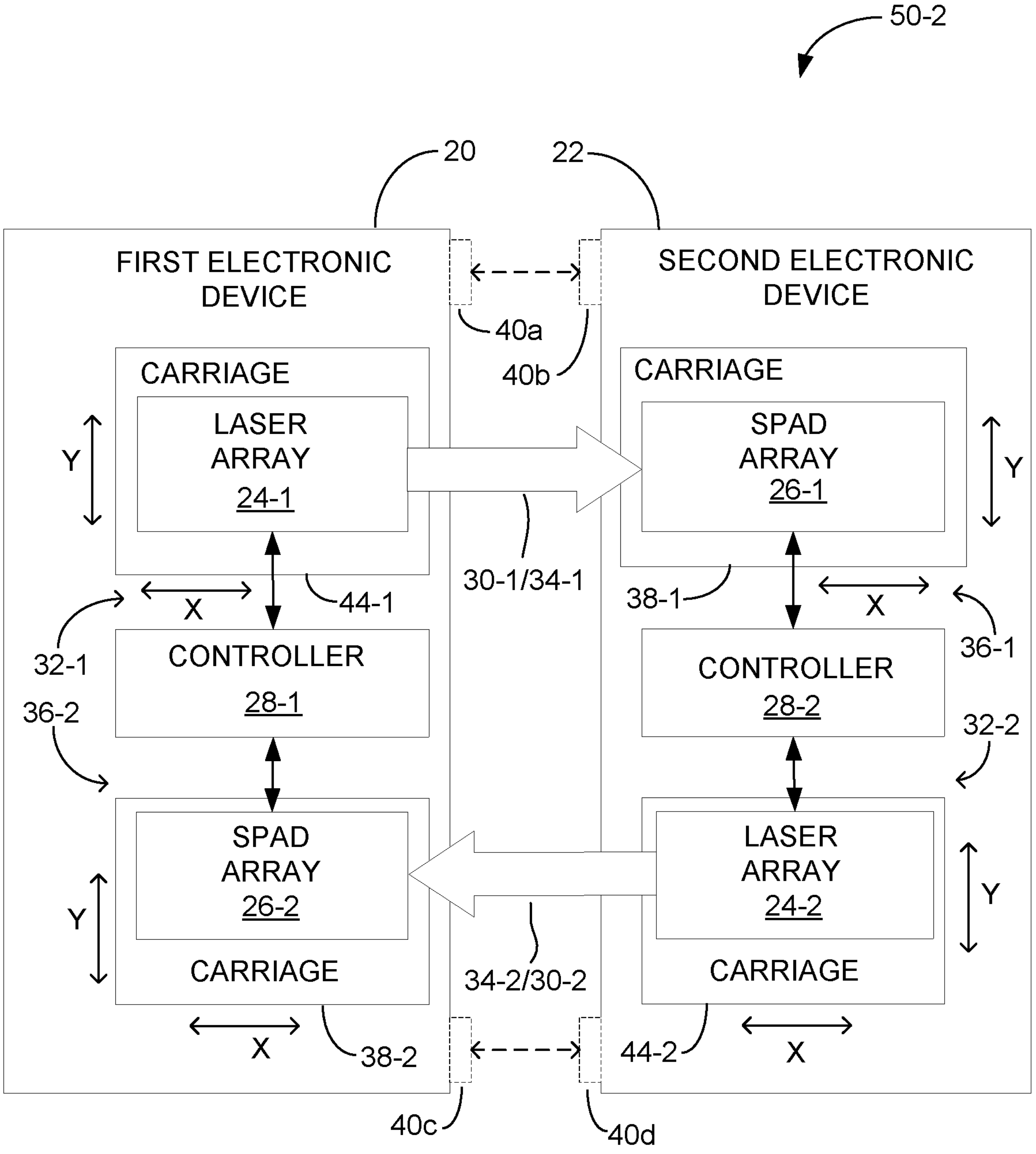
FIG. 3 is a block and schematic diagram generally illustrating a full duplex optical communication system, in accordance with the present disclosure.

FIG. 3 is a block and schematic diagram generally illustrating a full-duplex implementation of an optical communication system 50-2, in accordance with the present disclosure, which optically couples and provides full-duplex optical communication between first electronic device 20 and second electronic device 22. In addition to the elements of the single duplex optical communication system 50-1 described by FIG. 2, first electronic device 20 includes a second SPAD array 26-2, which together with first controller 28-1 represent a second receiver 36-2. Second electronic device 22 includes a second laser array 24-2, which together with second controller 28-2 represent a second transmitter 32-2. Together, second transmitter 32-2 of second electronic device 22 and second receiver 36-2 of first electronic device 20 form a single duplex communication system, where a second optical output signal 30-2 transmitted by second laser array 24-2 is received as second optical input signal 34-2 by second SPAD array 26-2. Together, the single duplex system formed by first transmitter 32-1 and first receiver 36-1, and the single duplex system formed by second transmitter 32-2 and second receiver 36-2 form a full duplex optimal communication system between first and second electronic devices 20 and 22.

In one example, second SPAD array 26-2 is disposed on a second moveable carriage 38-2. Similar to that described above by FIGS. 1 and 2, in examples, based on an a measured overlap between optical input signal 34-1 with SPAD array 26-1, controller 28-2 adjusts a position of carriage 38-1 to optimally align SPAD array 26-1 with optical input signal 34-1 (i.e., optical output signal 30-1 of laser array 24-1). Likewise, based on a measured overlap between optical input signal 34-2 with SPAD array 26-2, controller 28-1 adjusts a position of carriage 38-2 to optimally align SPAD array 26-2 with optical input signal 34-2 (i.e., optical output signal 30-2 of laser array 24-2).

In examples, first and second laser arrays 24-1 and 24-2 are respectively disposed on moveable carriages 44-1 and 44-2. In examples, when implements as a full duplex arrangement, first and second electronic devices 20 and 22 are able to provide feedback to one another regarding respective overlaps between respective optical input signals 34-2 and 34-1 and SPAD arrays 26-1 and 26-2. In examples, based on such feedback, controllers 28-1 and 28-2 adjust the respective positions of laser arrays 24-1 and 24-2 via movement of carriages 44-1 and 44-1 to achieve alignment of optical input signals 34-1 and 34-2 with SPAD arrays 26-1 and 26-2. In examples, alignment between laser arrays 24-1 and 24-2 with respective SPAD arrays 26-1 and 26-2 may be achieved via positional adjustment of SPAD arrays 26-1 and 26-2 via carriages 38-1 and 38-2, and/or positional adjustment of laser arrays 24-1 and 24-2 via carriages 44-1 and 44-2. Additionally, it is noted that full duplex optical communication system 50-2 may also employ mechanical alignment elements 40 and/or mechanical alignment device 42 as described above by FIG. 2.

According to examples, an optical communication system, in accordance with the present disclosure, such as single- and full-duplex optical communication systems 50-1 and 50-2 of FIGS. 2 and 3, may employ any number of different optical transmission schemes to optically communicate data, where any number of suitable encoding schemes may be employed with the different transmission schemes. FIGS. 4-8 below are block and schematic diagrams which illustrate and describe several example transmission schemes which may be employed by optical communication systems, such as single- and full-duplex systems 50-1 and 50-2, in accordance with the present disclosure. It is noted that FIGS. 4-8 are described primarily with reference to the single- and full-duplex communication systems 50-1 and 50-2 described above by FIGS. 2 and 3. It is further noted that the examples of FIGS. 4-8 are shown for illustrative purposes, and that other suitable techniques may be employed.

Figure 4:
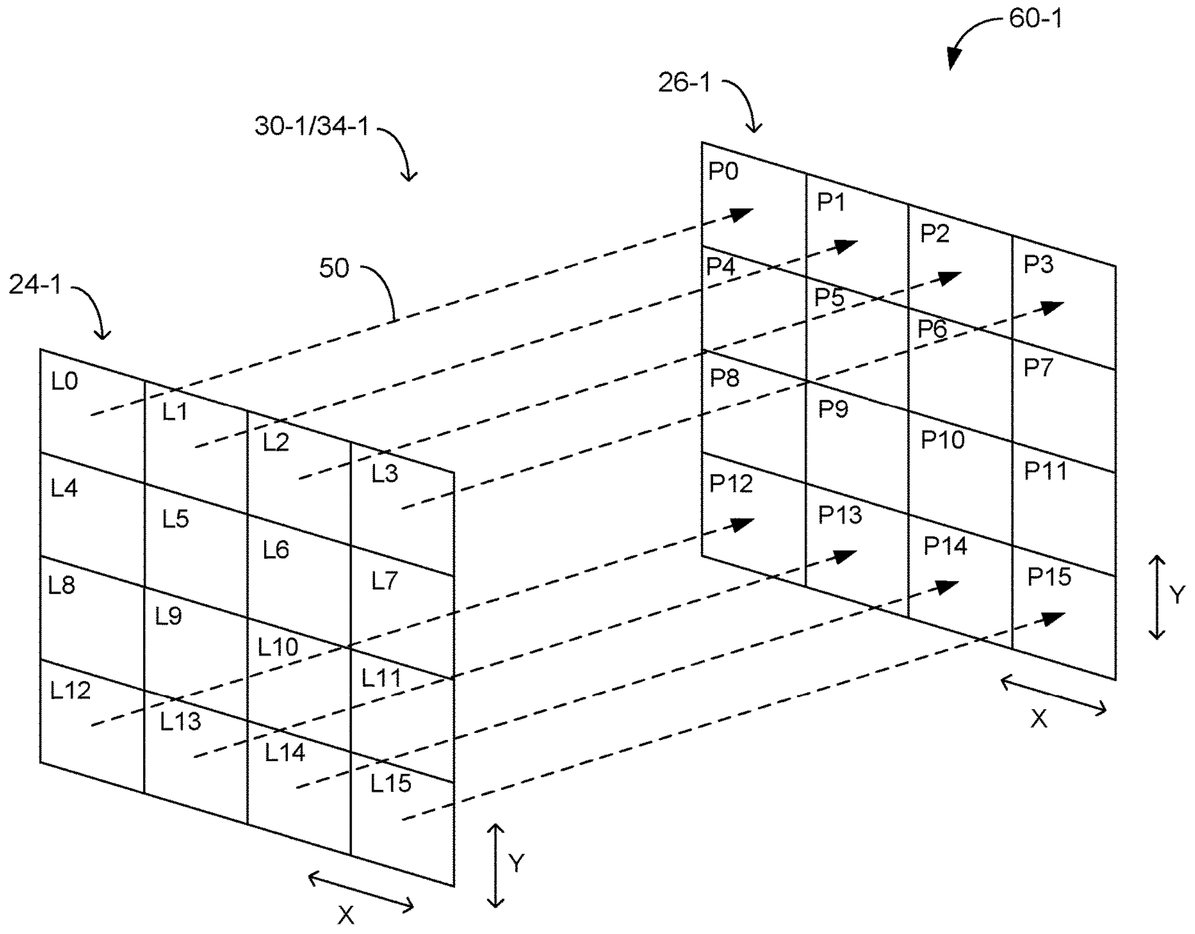
FIG. 4 is a block and schematic diagram generally illustrating a direct mode of optical communication, according to one example.

FIG. 4 is a block and schematic diagram generally illustrating what is referred to herein as a "direct" mode 60-1 of optical communication between first laser array 24-1 of first electronic device 20 and first SPAD array 26-1 of second electronic device 22, according to one example. In the illustrated example of FIG. 4, first laser array 24-1 is shown as being a 4×4 array of laser cells, indicated as laser cells L0 to L15, with each cell being individually controllable by first controller 28-1 to emit a controllable collimated light beam, such as illustrated by light beam 50 (e.g., a laser beam). As illustrated, together, the light beams 50 of laser cells L0 to L15 represent optical output signal 30-1 which, in-turn, represents optical input signal 34-1 to SPAD array 26-1. In the illustrated example, SPAD array 26-1 is also illustrated as being a 4×4 array of photocells, indicated as photocells P0 to 15, with each photocell individually providing an output signal representative of an amount of energy received from optical input signal 34-1.

In examples, laser and SPAD arrays 24-1 and 26-1 may be arrays having dimensions other than 4×4, and may be one-dimensional arrays (e.g., a single row or a single column of cells), or two-dimensional arrays (e.g., multiple rows and columns of cells). In examples, laser and SPAD arrays 24-1 and 26-1 may have different numbers of cells. In one case, SPAD array 26-1 may have larger dimensions than laser array 24-1 (i.e., more cells). For example, laser array 24-1 may be a 4×4 array while SPAD array 26-1 may be a 6×6 array so as to better ensure that at least a partial overlap is achieved between optical input signal 34-1 and SPAD array 26-1.

In a direct mode of operation, such as illustrated by direct mode 60-1, there is a one-to-one correspondence between laser cells L0 to L15 and photocells P0 to P15 of SPAD array 26-1 (i.e., the laser beam emitted by a given laser cell is received by a corresponding photocell). In the illustrated example, laser cell L0 corresponds to photocell P0, laser cells L1 corresponds to photocell P1, and so on. To transmit data from laser array 24-1 to SPAD array 26-1, controller 28-1 modulates and/or controls suitable characteristics (as described above) of light beam 50 of each laser cell L0 to L15 to encode data therein. The amount of energy received by a given photocell of SPAD array 26-1 via the laser beam 50 of the corresponding cell of laser array 24-1 is indicative of a bit of data represented by the received light beam 50.

In one example, each laser and photocell pair of laser array 24-1 and SPAD array 26-1 may represent a unique communication channel with each laser beam 50 transmitting a stream of data bits (e.g., a binary stream). In one example, each laser cell of laser array 24-1 may be controller to transmit a laser beam 50 at a different frequency, with the corresponding photocell tuned to receive light at the same frequency, such that laser cells L0 to L15 can simultaneously transmit data to their corresponding photocell (e.g., P0 to P15) without interference ("crosstalk") there between.

In another example, the cells of laser array 24-1 combined may represent a single channel. In one example, when a channel is formed by multiple laser cells, the optical output of each channel may be spatially encoded with data (e.g., 2-dimensionally encoded), such as in the form of a quick response (QR) code, for instance, which represents a 2-dimensional spatial pattern. In one example, the power level of laser beam 50 of each light cell of laser array 24-1 may be controlled to represent binary data (i.e., a "0" or a "1"). In one example, the power level of laser beam 50 of each light cell of 24-1 may be modulated so that each laser beam 50 may be controlled to represent data on a scale between "0" and "1" and, thus, represent multi-bit data (i.e., more than simply binary data). In on other examples, data can be encoded as a sequence of QR code patterns (e.g., a sequence of 2 or more QR code patterns) to thereby transmit 3-dimensionally encoded data.

Spatially encoding data in such fashion increases a bandwidth relative to transmitting data in the form of serial bit streams. In examples, an optical communication system in accordance with the present application may be adapted to employ any number of protocols, such as Thunderbolt 3 or higher, and protocols such as USB and HDMI, for example.

In examples, a setup (or alignment) procedure may be performed to optimally align light beams 50 of laser array 24-1 with the photocells of SPAD array 26-1 prior to commencement of optical data transmission. According to one example, during such a setup procedure, controller 28-1 of first electronic device 20 causes each laser cell L0 to L15 of laser array 24-1 to output a light beam 50, which is received by SPAD array 26-1 as optical input signal 34-1. In one example, during a setup procedure, light beams 50 may non-modulated. In one example, based on the output signals from photocells P0 to P15 of SPAD array 26-1, controller 28-2 of second electronic device 22 determines and overlap of optical input signal 34-1 with SPAD array 26-1, and adjusts the position of receiver carriage 38-1 to optimally align SPAD array 26-1 with optical input signal 34-1. Upon completion of such setup procedure, controller 28-1 begins optically transmitting encoded date to second electronic device 22 via optical output signal 30-1.

As an illustrative example of such a setup procedure, assume upon startup that laser beams 50 of laser cells L0, L1, L4, and L5 of laser array 24-1 align with photocells P10, P11, P14 and P15 of SPAD array 26-1. In response, controller 28-2 adjusts the position receiver carriage 38-1 to move SPAD array 26-1 by the dimension of two cells in the positive x-direction and the dimension of two cells in the negative y-direction. In one example, controller 28-2 then "fine tunes" the position of SPAD array 26-1 by incrementally moving receiver carriage in the x- and y-directions until a signal strength from photocells P0 to P15 is optimized, thereby optimally aligning SPAD array 26-1 with optical input signal 34-1 (i.e., optical output signal 30-1 from laser array 24-1).

Using the same example as above, when implemented as a full duplex optical communication system, such as optical communication system 50-2 of FIG. 3, in one example, rather than adjusting a position of SPAD array 26-1 to achieve optimal alignment, a position of laser array 24-1 may be adjusted by controller 28-1 via movement of laser carriage 44-1. In such case, controller 28-2 of second electronic device 22 determines the initial overlap between SPAD array 26-1 and optical input signal 34-1 and transmits such overlap information to SPAD array 26-2 of first electronic device 20 via optical output signal 30-2 of laser array 24-2 of second electronic device 22. Controller 28-1 receives the encoded overlap information from SPAD array 26-2 and, in this example, adjusts a position of laser carriage 44-1 to move laser array 24-1 by the dimension of two cells in the negative x-direction and by the dimension of two cells in the positive y-direction.

In other examples, when implemented as a full-duplex arrangement, the positions of both laser array 24-1 and SPAD array 26-1 may be adjusted to achieve optimal alignment there between. Adjusting the positions of both laser array 24-1 and SPAD array 26-1 enables larger misalignments between laser array 24-1 and SPAD array 26-1 to be corrected.

In some examples, initial misalignment between first and second electronic devices 20 and 22 may be large enough that, after the setup procedure, not all laser cells L0 to L15 are able to be aligned with a corresponding one of the photocells P0 to P15 of SPAD array 26-1 (i.e., full alignment is not achieved). In such case, according to one example, when implemented in a full-duplex arrangement, such as optical system 50-2, controller 28-2 of second electronic device 22 communicates to first electronic device 20 via optical output signal 30-2 (i.e., optical input signal 34-2) overlap data indicating which cells are overlapping between optical input signal 34-1 and SPAD array 26-1 (i.e. which represents the optimal alignment is such case). As an example, in one case, after the setup procedure is completed, optimal alignment may result in laser cells L0-L11 being respectively aligned with photocells P4 to P15 of SPAD array 26-1. In such case, based on the measured overlap with SPAD array 26-1, controller 28-2 optically transmits the optimal overlap information to first electronic device 20 via optical output signal 30-2. In one example, based on the optimal overlap information, controllers 28-1 and 28-2 adjust the transmission and/or encoding scheme employed so as to transmit information via only laser cells L0 to L11 and corresponding photocells P4 to P15 in the most efficient manner.

Figure 5:
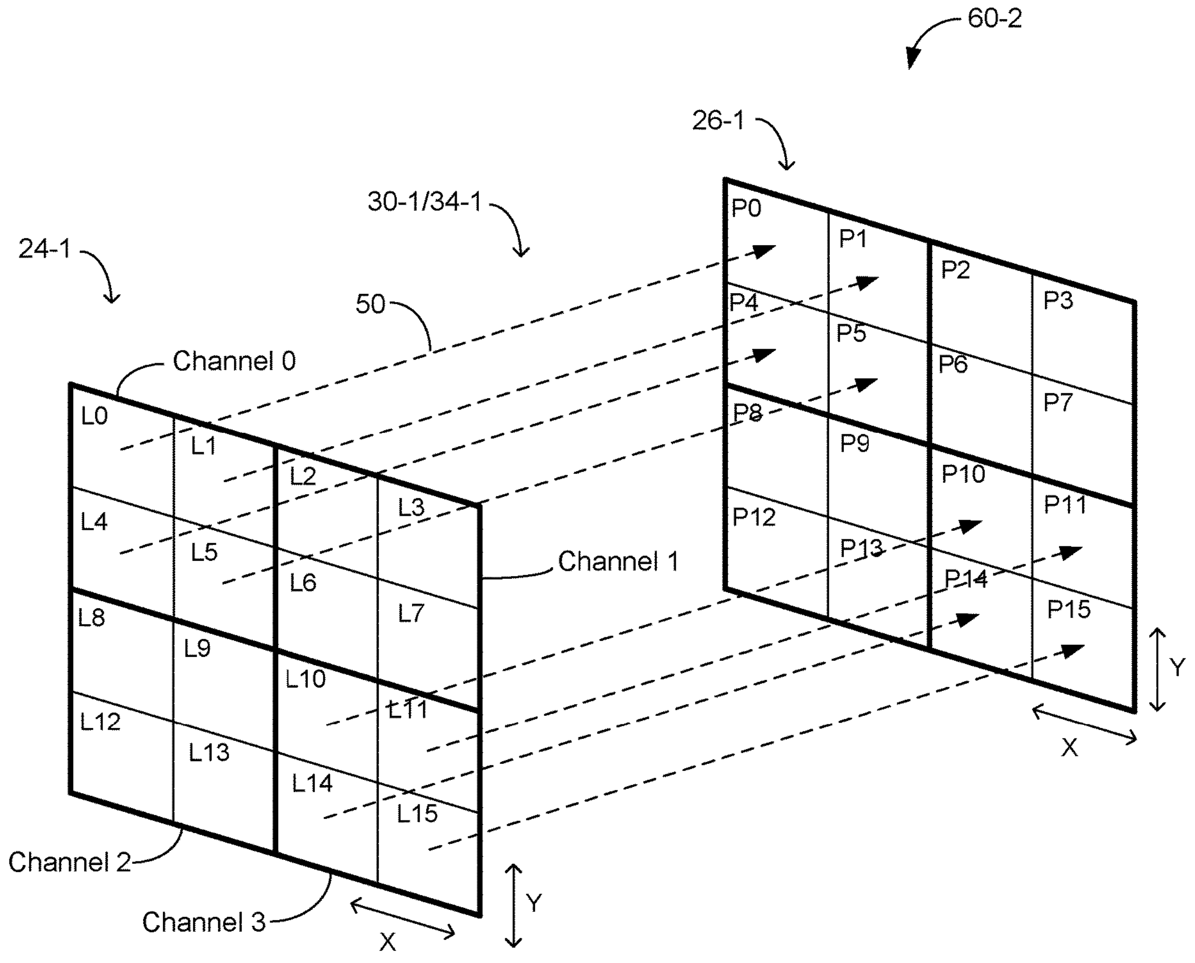
FIG. 5 is a block and schematic diagram generally illustrating a direct mode of optical communication, according to one example.

FIG. 5 is a schematic diagram generally illustrating a "direct" mode 60-2 of optical communication between first laser array 24-1 of first electronic device 20 and first SPAD array 26-1 of second electronic device 22, according to one example. Direct mode 60-2 of FIG. 5 is the same as direct mode 60-1 (described above with respect of FIG. 4) in that there is a one-to-one correspondence between laser cells L0 to L15 of laser array 24-1 and photocells P0 to P15 of SPAD array 26-1, but, according to examples of direct mode 60-2, multiple laser-photodiode cells pairs of laser array 24-1 and SPAD array 26-1 are grouped to form a number of communication channels, such as communication channels 0 to 3, for instance.

In one case, as illustrated, laser cells L0, L1, L4, and L6 are grouped with photocells P0, P1, P4, and P6 to form Channel 0, laser cells L2, L3, L6, and L7 are with photocells P2, P3, P6, and P7 to form Channel 1, laser cells L8, L9, L12, and L13 are grouped with photocells P8, P9, P12, and P13 to form Channel 2, and laser cells L10, L11, L14, and L15 are grouped with photocells P10, P11, P14, and P15 to form Channel 3. The illustration of FIG. 5 is only one example, and it is noted that any number of different laser-photocell pairs may be grouped to form different communication channels.

In one example, laser beams 50 of each channel may be controlled by controller 28-1 so as to be encoded with different data such that each channel may transmit data using a 2D (or 3D) encoding scheme. In other examples, laser beams 50 of each channel may be controlled by controller 28-1 so as to be encoded with the same data so as to increase a signal strength of each channel (i.e., a binary data stream). In one example, each laser beam 50 is controlled to transmit at a different frequency with the corresponding photocell tuned to same frequency so that laser cells L0 to L15 can simultaneously transmit data without "crosstalk" there between.

Figure 6:
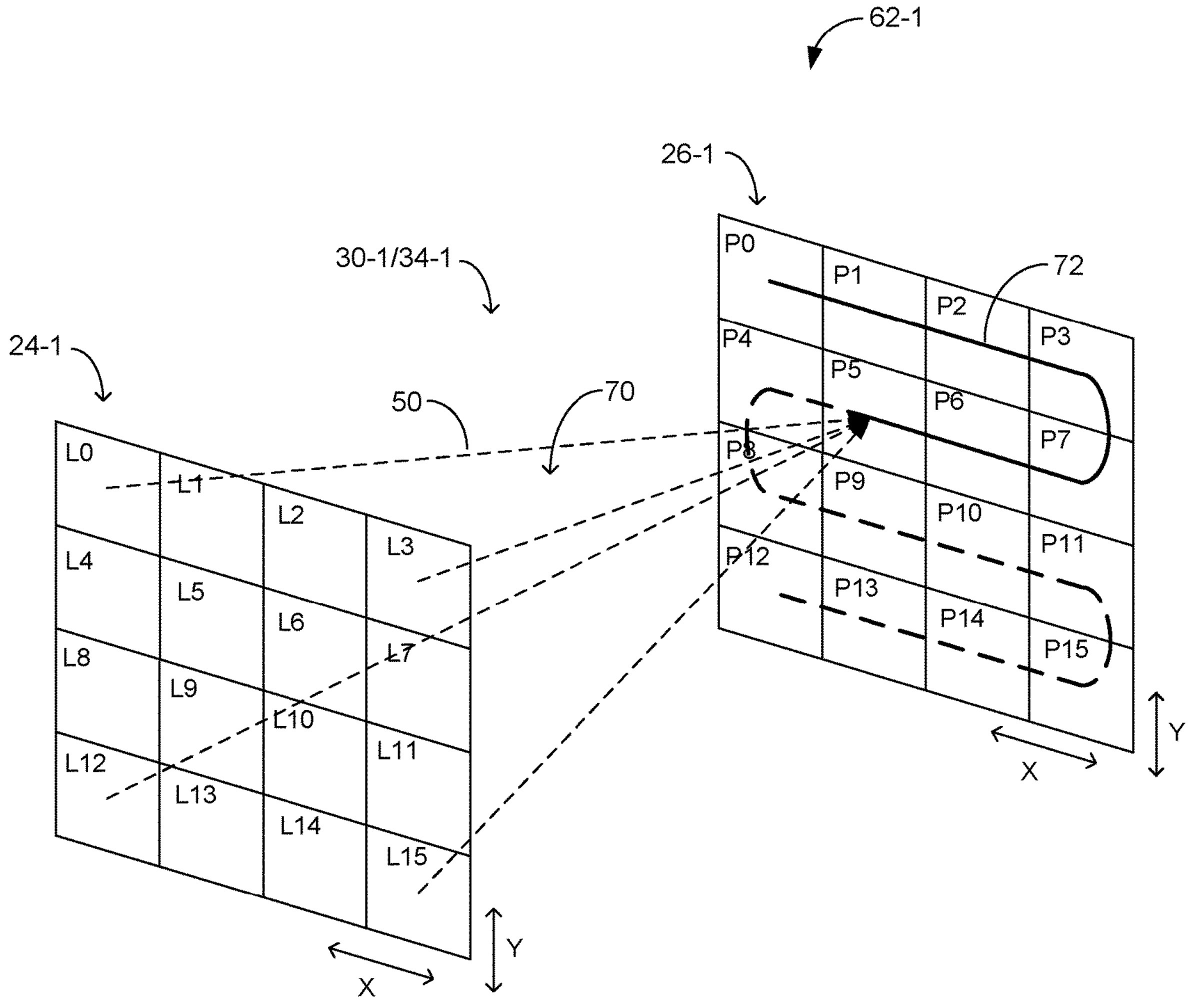
FIG. 6 is a block and schematic diagram generally illustrating a scanning mode of optical communication, according to one example.

FIG. 6 is a block and schematic diagram generally illustrating a "scanning" mode 62-1 of optical communication between first laser array 24-1 and first SPAD array 26-1 of first and second electronic devices 20 and 22, according to one example. In the illustrated example, controller 28-1 of first electronic device 20 operates first laser array 24-1 as a phased-array by controlling and coordinating a phase-modulation of laser cells L0 to L15 such that laser beams 50 of laser cells L0 to L15 combine to form a single steerable laser beam 70. In other words, optical output signal 30-1 is a single steerable laser beam 70. In one example, to operate first laser array 24-1 as a phased array, controller 28-1 applies individual power signals to each laser cell L0-L15, where the phases of the individual power signals are offset from one another in a controllable sequence to cause light beams 50 to be additive in a selected direction, and thereby form steerable laser beam 70 (which is steerable via phase control of the individual power signals).

In one example, first controller 28-1 steers laser beam 70 in a zig-zag pattern 72 across SPAD array 26-1, such that laser beam may also be referred to as a scanning laser beam 70. Encoded data within scanning laser beam 70 is read by photocells P1 to P15 as scanning laser beam 70 travels along zig-zag scanning path 72. Although illustrated as being directed along a zig-zag scanning path 72, controllable scanning laser beam 70 may be directed by first controller 28-1 to follow any suitable path.

In examples, during an initial setup procedure, first controller 28-1 may operator laser array 24-1 in a direct mode, such as illustrated by FIG. 4, whereby second controller 28-2 and first controller 28-1 may respectively adjust the positions of first laser array 24-1 and first SPAD array 26-1 via corresponding moveable carriages 38-1 and 44-1 based on an overlap of optical input signal 34-1 (i.e., optical output signal 30-1) with SPAD array 26-1.

In another example, during an initial setup procedure, first controller 28-1 may steer scanning laser beam 70 along a predetermined "search" path until scanning laser beam 70 is detected by SPAD array 26-1. In one example, based on the photocell(s) P0 to P16 at which scanning laser beam 70 is detected, first controller 28-1 adjusts the phase offsets of the individual power signals to laser cells L0 to L15 to direct scanning laser beam 70 along a desired scanning path, such as scanning path 72 to optically transmit encoded data to SPAD array 26-1. In another example, based on the photocell(s) P0 to P16 at which scanning laser beam 70 is detected, controller 28-1 adjusts the position of SPAD array 26-1 via moveable carriage 38-1.

Figure 7:
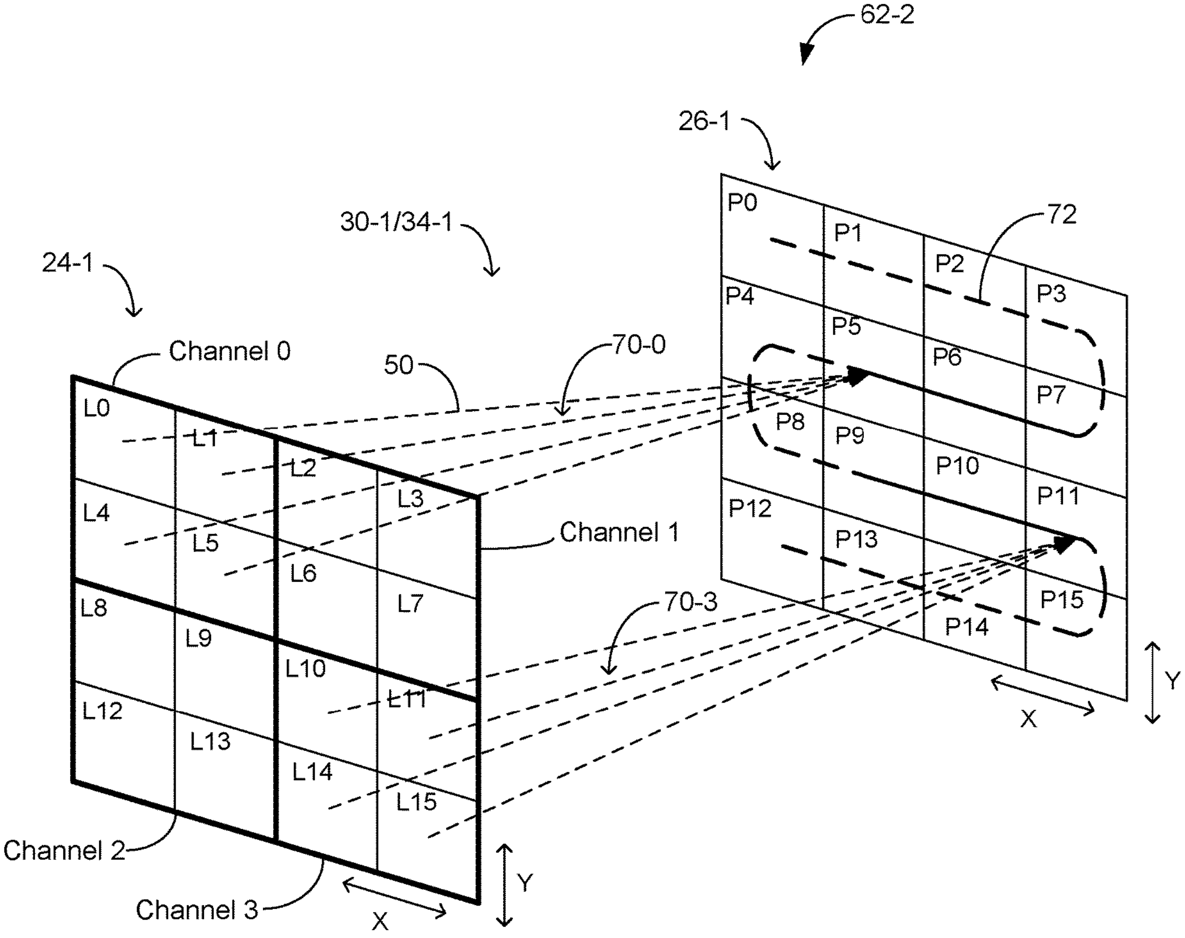
FIG. 7 is a block and schematic diagram generally illustrating a scanning mode of optical communication, according to one example.

FIG. 7 is a block and schematic diagram generally illustrating a "scanning" mode 62-2 of optical communication between first laser array 24-1 and first SPAD array 26-1 of first and second electronic devices 20 and 22, according to one example. Similar to the arrangement of FIG. 5, according to scanning mode 62-2 of FIG. 7, multiple laser cells of laser array 24-1 are grouped to form a number of communication channels, such as illustrated by communication channels 0 to 3.

In one case, as illustrated, laser cells L0, L1, L4, and L6 are grouped to form Channel 0, laser cells L2, L3, L6, and L7 are grouped to form Channel 1, laser cells L8, L9, L12, and L13 are grouped to form Channel 2, and laser cells L10, L11, L14, and L15 are grouped to form Channel 3. According to scanning mode 62-2, controller 28-1 operates the laser cells of each channel as separate phased arrays such that laser beams 50 of the laser cells of each channel combine to form a corresponding scanning laser beam, such as illustrated by scanning laser beams 70-0 (corresponding to channel 0) and 70-3 (corresponding to channel 3).

In one example, as illustrated, the scanning laser beams of each channel, such as scanning laser beams 70-0 and 70-3 may be directed along a same scanning path, such as zig-zag canning path 72, but be temporally offset from one another to enable a readout of the output signals of photocells P0 to P15. Any number of scanning patterns may be employed.

Figure 8:
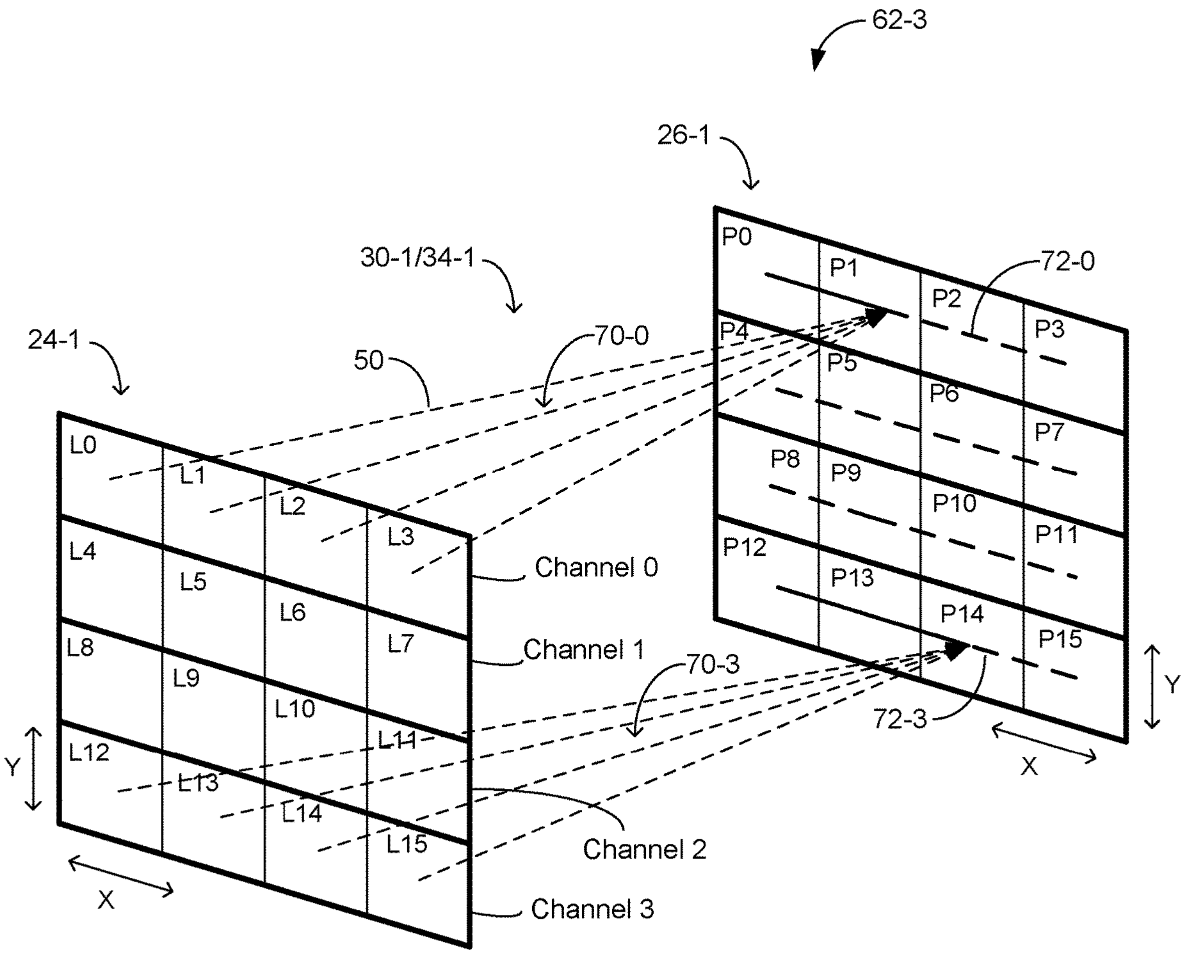
FIG. 8 is a block and schematic diagram generally illustrating a scanning mode of optical communication, according to one example.

FIG. 8 is a block and schematic diagram generally illustrating a "scanning" mode 62-3 of optical communication between first laser array 24-1 and first SPAD array 26-1 of first and second electronic devices 20 and 22, according to one example. Scanning mode 63-3 is similar to scanning mode 62-2 of FIG. 6, except that groups of laser cells L0 to L15 of laser array 24-1 are grouped with corresponding photocells P0 to P15 to form a number of communication channels, such as illustrated by communication channels 0 to 3. Additionally, as opposed to the 2-dimensional channels 0 to 3 of scanning mode 62-2 of FIG. 7, the channels 0 to 3 of scanning mode 62-3 of FIG. 8 are 1-dimensional channels (e.g., 1×4 arrays).

In one example, as illustrated, laser cells L0 to L3 and corresponding photocells P0 to P3 form channel 0, laser cells L4 to L7 and corresponding photocells P4 to P7 form channel 1, laser cells L8 to L11 and corresponding photocells P8 to P11 form channel 2, and laser cells L12 to L15 and corresponding photocells P12 to P15 form channel 3.

According to scanning mode 62-3, controller 28-1 operates the laser cells of each channel as separate phased arrays such that laser beams 50 of the laser cells of each channel combine to form a corresponding scanning laser beam, such as illustrated by scanning laser beams 70-0 (corresponding to channel 0) and 70-3 (corresponding to channel 3). In examples, because each channel is formed using a 1-dimensional array of laser cells, controller 28-1 can control the phase sequence of the individual power signals to the laser cells of each channel so as to steer the corresponding scanning laser beam along a 1-dimensional path, such as steering scanning laser beam 70-0 of channel 0 along a repeating path 72-0 across photocells P0 to P3, and steering scanning laser beam 70-3 of channel 3 along a repeating path 72-3 across photocells P12 to P15.

Figure 9:
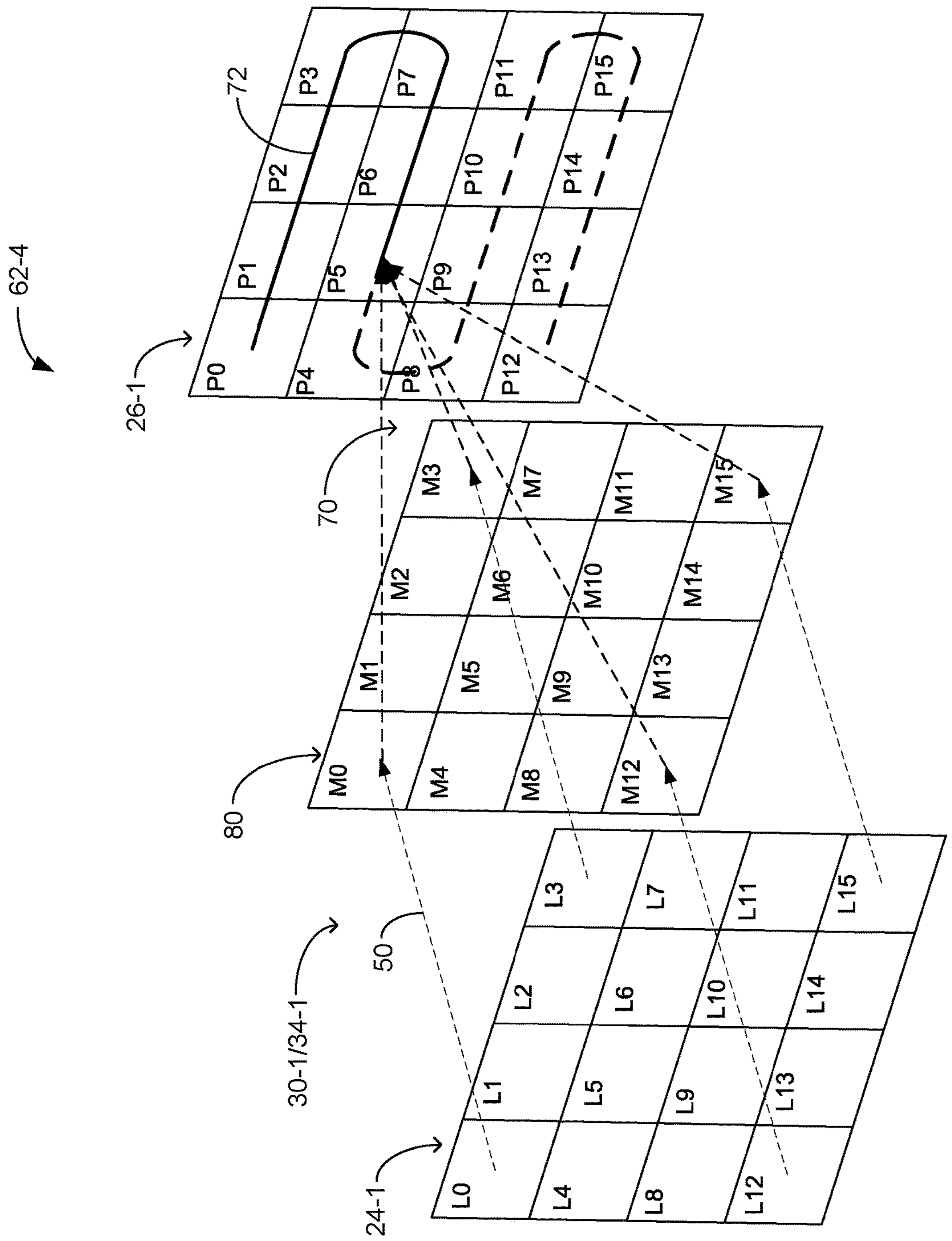
FIG. 9 is a block and schematic diagram generally illustrating a scanning mode of optical communication, according to one example.

FIG. 9 is a block and schematic diagram generally illustrating a scanning mode 62-4 of optical communication between first laser array 24-1 and first SPAD array 26 of first and second electronic devices 20 and 22, according to one example. According to the example of FIG. 9, in addition to first laser array 24-1, first electronic device 20 includes a mechanical device 80 controllable by first controller 28-1 to steer the light beam 50 of each laser cell of first laser array 24-1, such as laser cells L0 to L15. In one example, mechanical device 80 is a microelectromechanical device having an array of controllable mirrors, illustrated as mirrors M0 to M15, which correspond to light cells L0 to L15 of first laser array 24-1. In examples, each mirror M0 to M15 is controllable via a suitable actuation mechanism (such as a piezoelectric actuator, magnetoresistive actuator, and electromagnetic actuator, for example) so as to direct or steer the incoming light beam 50 received from the corresponding laser cell of laser array 24-1.

As illustrated, according to one example, in a fashion similar to that illustrated and described by FIG. 6, controller 28-1 controls mirrors M0 to M15 to combine light beams 50 of laser array 24-1 to form a single steerable laser beam 70. In other words, optical output signal 30-1 of laser array 24-1 is a single steerable laser beam 70. In one example, first controller 28-1 controls mirrors M0 to M15 to scan steerable laser beam 70 along zig-zag scanning path 72 across photocells P0 to P15 of first SPAD array 26-1. In other examples, first controller 28-1 may control mirrors M0 to M15 of MEMs device 80 so as to steer laser beam 70 along any suitable path. In other examples, first controller 28-1 may control first laser array 24-1 and the mirrors M0 to M15 of MEMs device 80 to operate in fashions similar to that illustrated above by FIGS. 7 and 8 (i.e., to form multiple channels). In other examples, first controller 28-1 may control first laser array 24-1 and the mirrors M0 to M15 of MEMs device 80 to operate in direct modes, similar to that illustrated by FIGS. 4 and 5.

It is noted that in both direct and scanning modes of operation, optical communication systems, in accordance with the present disclosure, may employ any suitable encoding scheme such as temporal encoding (e.g., a binary data stream), spatial encoding (e.g., 2- and 3-D encoding, such as QR codes, for instance), and a combination of both, for example. Additionally, in scanning modes of operation, a scanning rate may also be employed for encoding. Additionally, it is noted that, in some examples, the scanning mode employed may be selected such that a direct mode may be employed in one instance and a scanning mode may be employed in another instance (e.g., based on an optimal overlap). Further, in some examples, a channel configuration may be selectable (e.g., the laser and photocell arrays may be virtually portioned).

Figure 10:
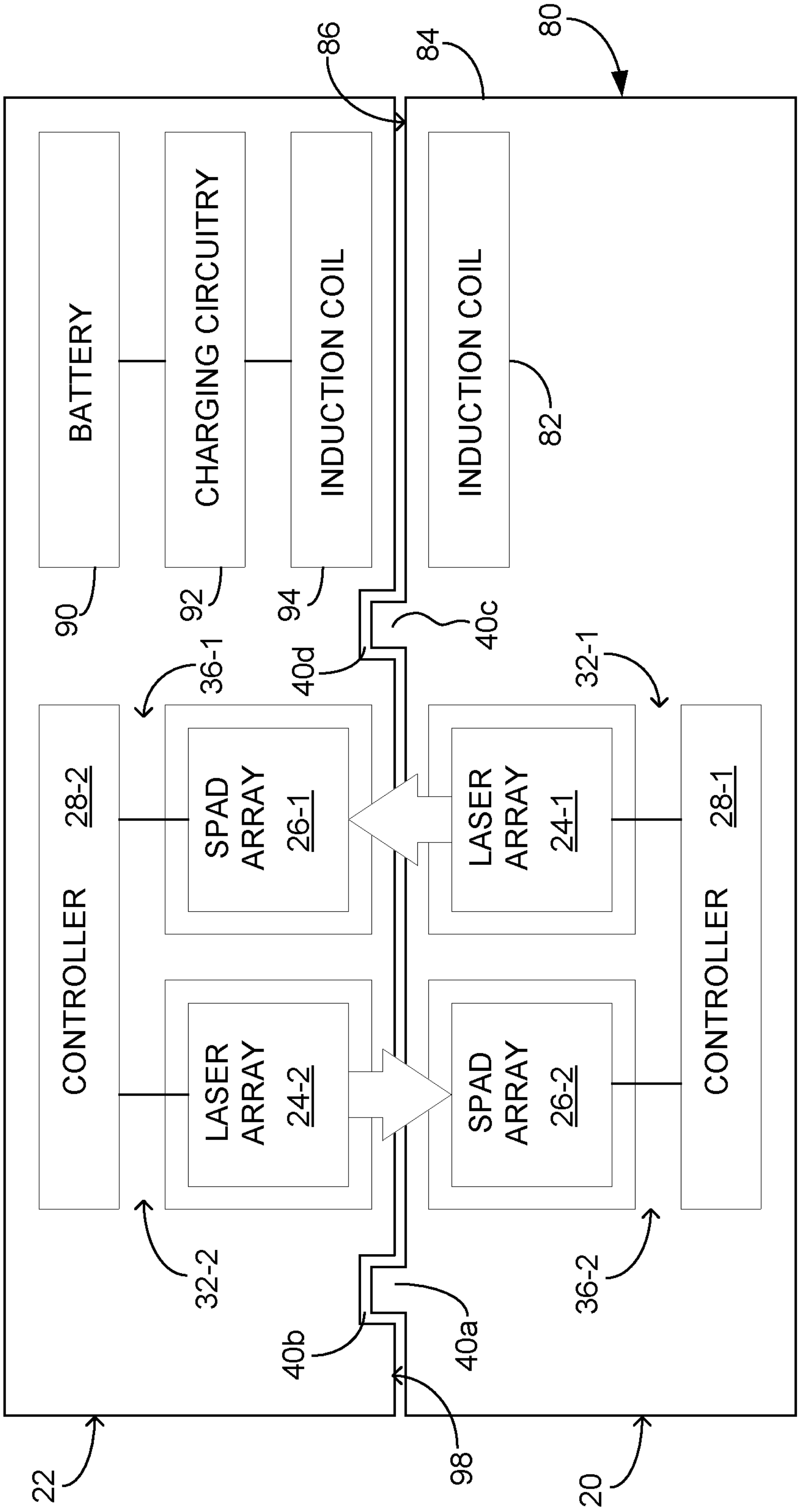
FIG. 10 is a block and schematic diagram generally illustrating a docking station employing an optical communication system, in according to one example.

FIG. 10 is a block and schematic diagram of an example of a full-duplex implementation of an optical communication system 50-2, such as illustrated above by FIG. 4, where first electronic device 20 is implemented as a docking station 80, in accordance with the present disclosure. In examples, in addition to laser array 24-1, SPAD array 26-2, and controller 28-1, docking station 80 includes an induction coil 82, and a housing 84 having a surface 86 including mechanical alignment elements 40*a* and 40*c* extending therefrom. In examples, as illustrated, mechanical alignment elements 40*a* and 40*c* are implemented as raised elements or tabs extending from surface 86.

In examples, second electronic device 22 is a portable electronic device (e.g., laptop, tablet, cell phone, etc.) which, in addition to laser array 24-2, SPAD array 26-1, and controller 28-2, includes a battery 90, a charging circuit 92, an induction coil 94, and a housing 96 having a surface 98 including mechanical alignment elements 40*b* and 40*d*. In examples, as illustrated, mechanical alignment elements 40*b* and 40*d* are implemented as notches or recesses adapted to respectively receive mechanical alignment elements 40*a* and 40*c* of docking station 80.

To dock second electronic device 22 with docking station 80, surface 98 is disposed on surface 86 of docking station 80 such that mechanical alignments elements 40*b* and 40*d* respectively receive mechanical alignment elements 40*a* and 40*c*. Upon mechanical alignment elements 40*b*, 40*d* receiving mechanical alignment elements 40*a* and 40*c*, laser array 24-1 and SPAD array 26-2 of docking station 80 are respectively in coarse alignment with SPAD array 26-1 and laser array 24-2 of second electronic device 22. Final alignment between laser array 24-1 and SPAD array 26-1, and between laser array 24-2 and SPAD array 26-2 may then be established as described above (e.g., by adjustment of the laser and SPAD arrays via corresponding moveable carriages 38-1, 38-2, 44-1, and 44-2, and/or adjustment of the position of steerable laser beams 70 via adjustments to phase sequencing or control of corresponding MEMs devices). Once optimal alignment is achieved, optical data communication may commence between electronic device 22 and docking station 80.

Upon mechanical alignment elements 40*b*, 40*d* receiving mechanical alignment elements 40*a* and 40*c*, alignment is also achieved between induction coil 82 of docking station 80 and induction coil 94 of electronic device 22. A charging current induced by induction coil 82 in induction coil 94 is adapted and employed by charging circuitry 92 to charge battery 90.

In examples, docking station 80 (i.e., first electronic device 22) is arranged as a pad on which electronic device 22 is placed. Any number of suitable arrangement may be employed. By combining a wireless battery charging system with an optical communication system, in accordance with the present disclosure, docking station 80 provides a completely wireless docking solution for portable computing devices (e.g., laptops). Additionally, depending on the encoding scheme employed (e.g., 2D encoding), docking station 80 may have increased data transmission rates as compared to conventional wired docking stations. It is noted FIG. 10 represents only one example of a docking station, and that any number of suitable implementations may be employed.

Figure 11:
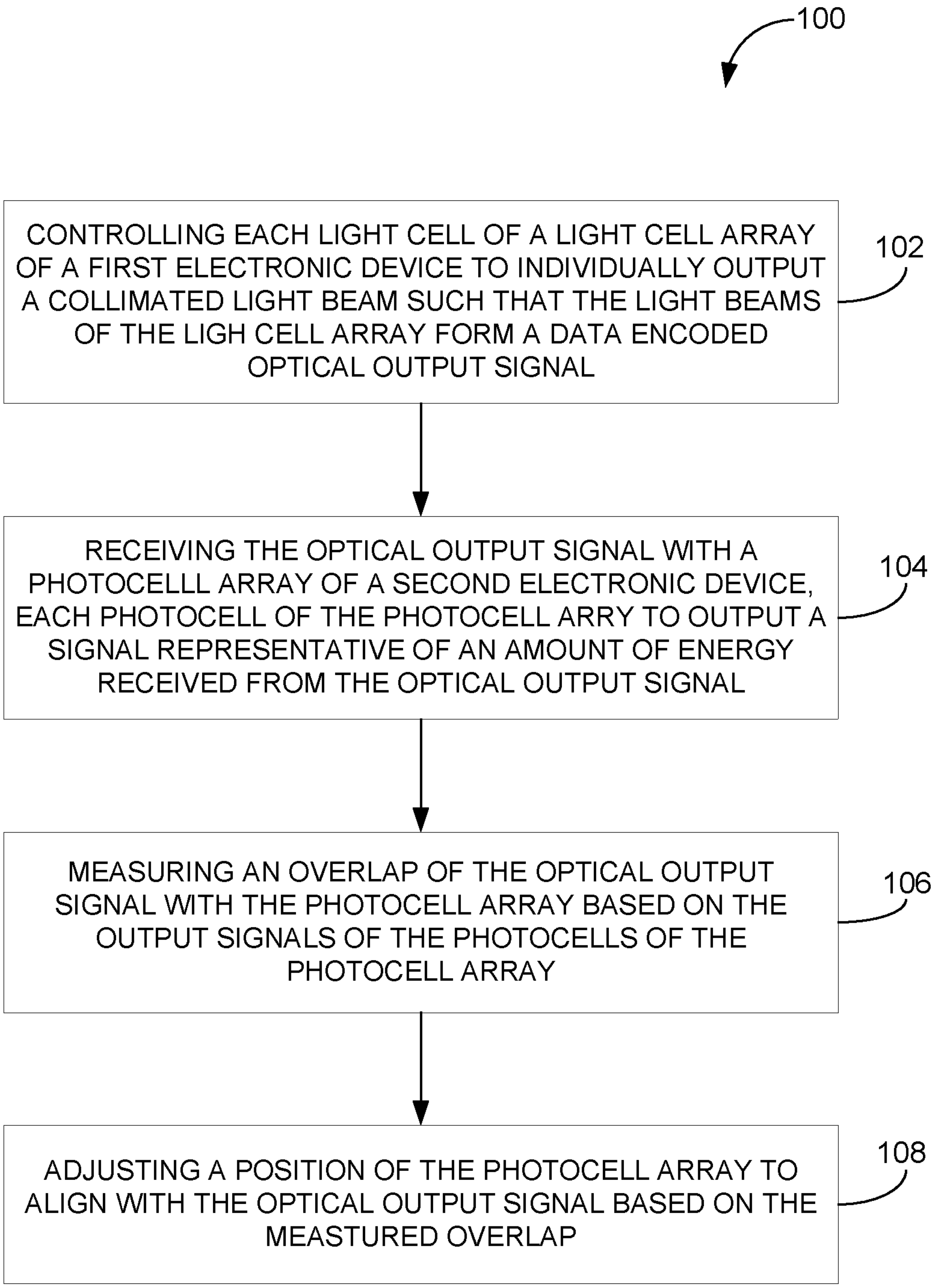
FIG. 11 is a flow diagram generally illustrating a method of operating an optical communication system, according to one example.

FIG. 11 is a flow diagram generally illustrating a method 100 of operating an optical communication system, such as the optical communication system 50-1 of FIG. 2. At 102, the method includes controlling each light cell of a light cell array of a first electronic device to individually output a collimated light beam such that the light beams of the light cell array form a data encoded optical output signal, such as controller 28-1 of first electronic device 20 controlling the cells of laser array 24-1 to form data encoded optical output signal 30-1 as illustrated by FIG. 2.

At 104, the method includes receiving the optical output signal with a photocell array of a second electronic device, each light cell of the photocell array to provide an output signal indicative of an amount of energy received from the optical output signal, such as receiving optical output signal 30-1 from laser array 24-1 with SPAD array 26 of second electronic device 22, as illustrated FIG. 2.

At 106, the method includes determining an overlap of the optical output signal with the photocell array based on the optical output signals of the photocell array, such as controller 28-2 of second electronic device 22 measuring an overlap of optical output signal 30-1 with SPAD array 26-1, as illustrated by FIG. 2. As 108, the method includes adjusting a position of the photocell array to align with the optical output signal based on the overlap, such as controller 28-2 adjusting a position of SPAD array 26-1, via moving of carriage 38-1, for example, to align with optical output signal 30-1, as illustrated by FIG. 2.

In summary, high frequency modulation of a light cell array (e.g., VCSEL array) and speed of light transmission enables an optical communication system, in accordance with the present disclosure, to provide higher bandwidth and lower latency communication relative to traditional wireless communication employing radio frequency communication (e.g., Bluetooth, WiFi). Also, an optical communication, as disclosed herein, is more difficult to eavesdrop by malicious parties, and thereby provides enhanced privacy and security relative to conventional radio frequency communications. Additionally, an optical communication system described herein is not disrupted by magnetic fields, as are RF communications and, thus, can be employed in the presence of metal components which enables implementation in a variety of environments and device form factors. Furthermore, an optical communication system, in accordance with the present disclosure, enables any number of encoding and protocol schemes to be employed, including high density spatial encoding schemes, and also enables simultaneous multi-channel data transmission which further increases bandwidth relative to radio communications systems and wired systems. Additionally, the transmission schemes (e.g., direct, scanning, multi-channels, etc.), and encoding and protocol schemes can be adapted to meet bandwidth requirements for a particular implementation.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An electronic device with optical communications comprising:

a docking station, the docking station including an inductive charging coil and a housing;

a light cell array, each light cell individually operable to output a controllable collimated light beam, the light beams of the light cell array to form a data encoded optical output signal to transmit to a destination electronic device, wherein the destination electronic device is external to the housing;

a photocell array to receive a data encoded optical input signal from the destination electronic device, each photocell to provide an output signal representative of an amount of energy received from the optical input signal; and a controller to:

measure an overlap of the optical input signal with the photocell array based on the output signals of the array of photocells; and adjust a position of the photocell array based on the measured overlap to align the photocell array with the optical input signal, wherein the housing includes a plurality of first mechanical alignment features, the first mechanical alignment features to engage second mechanical alignment features of the destination electronic device to respectively align the photocell array, the light cell array, and the inductive charging coil of the docking station with a light cell array, a photocell array, and an inductive charging coil of the destination electronic device.

2. The electronic device of claim 1, further including:

a moveable receiver carriage to which the photocell array is mounted, the controller to adjust a position of the receiver carriage to align the photocell array with the optical input signal.

3. The electronic device of claim 1, wherein the light cell array comprises an array of vertical cavity surface emitting laser diodes.

4. The electronic device of claim 1, wherein the photocell array comprises an array of single photon avalanche diodes.

5. A system for optical communication comprising:

a first electronic device comprising:

a first housing;

a first light cell array, each light cell controllable to output a collimated light beam; and a first controller to control each light cell of the first light cell array such that the light beams of the cells of the light cell array form a data encoded first optical output signal;

a second electronic device external to the first housing, the second electronic device comprising:

a second housing;

a first photocell array to receive the first optical output signal, each photocell to provide an output signal representative of an amount of energy received from the first optical output signal; and a second controller to:

measure an overlap between the first optical output signal and the first photocell array based on the output signals of the photocells of the first photocell array; and adjust a relative position of the first photocell array to the first optical output signal based on the measured overlap to adjust an alignment of the first photocell array with the first optical output signal, wherein the first controller is to:

phase-modulate the light cells of the first light cell array such that the light beams of the first light cell array combine to form the first optical output signal comprising at least one directionally steerable light beam; and adjust the phase modulation of the light cells based on the measured overlap to adjust steering the at least one steerable light beam so as to align with the first photocell array.

6. The system of claim 5, wherein the optical output signal comprises an individual light beam from each light cell of the first light cell array, each light beam corresponding to a different one of the photocells of the first photocell array, the individual light beams and corresponding photocells grouped to form a number of optical communication channels.

7. The system of claim 5, wherein the second electronic device includes:

a moveable first receiver carriage to which the first photocell array is mounted, the second controller to adjust a position of the first receiver carriage to align the first photocell array with the first optical output signal.

8. The system of claim 5, wherein:

the second electronic device includes:

a second light cell array, each light cell controllable to output a collimated light beam; wherein:

the second controller is to control each light cell of the second light cell array such that the light beams of the cells of the second light cell array form a data encoded second optical output signal; and the first electronic device includes:

a second photocell array to receive the second optical output signal, each photosensitive cell to provide an output signal representative of an amount of energy received from the second optical output signal.

9. The system of claim 8, wherein:

the second controller is to control each light cell of the second light cell array to encode the second optical output signal with data representative of the measured overlap between the first optical output signal and the first photocell array; and the first controller, based on the data representative of the measured overlap encoded in the second optical output received by the second photocell array, is to adjust a position of the first optical output signal to align the first optical output signal with the first photocell array.

10. The system of claim 8, wherein the first electronic device includes:

a moveable first transmitter carriage to which the first light cell array is mounted, to align the first optical output signal with the first photocell array, the first controller to adjust a position of the transmitter carriage.

11. The system of claim 8, wherein the first electronic device includes an array of controllable micro-electrical mechanical (MEMs) devices, each MEMs device separately controllable and corresponding to a different one of the light cells of the first light cell array, wherein the first controller is to separately control each MEMs device such that the light beams of the first light cell array combine to form the first optical output signal comprising at least one directionally steerable light beam, the first controller to adjust each MEMs device based on the measured overlap to adjust steering of the at least one directionally steerable light beam so as to align with the first photocell array.

12. The system of claim 5, wherein the first controller is to encode the first optical output signal using spatial encoding, including at least two-dimensional encoding.

13. A method of operating an optical communication system comprising:

controlling each light cell of a light cell array of a first electronic device to individually output a collimated light beam such that the light beams of the light cell array form a data encoded optical output signal;

receiving the optical output signal with a photocell array of a second electronic device, the second electronic device being located external to a housing of the first electronic device, each photocell of the photocell array to provide an output signal indicative of an amount of energy received from the optical output signal;

measuring an overlap of the optical output signal with the photocell array based on the output signals of the photocell array;

adjusting a position of the photocell array to align with the optical output signal based on the measured overlap;

phase-modulating the light cells of the light cell array such that the light beams of the light cell array combine to form the optical output signal comprising at least one directionally steerable light beam; and adjusting the phase modulation of the light cells based on the measured overlap to adjust steering the at least one steerable light beam so as to align with the photocell array.

14. The electronic device of claim 1, the inductive charging coil of the docking station to induce a charging current in the inductive charging coil of the destination electronic device.

15. The system of claim 5, further comprising: a mechanical alignment device separate from the first electronic device and the second electronic device, the mechanical alignment device to mechanically receive and align the first electronic device and the second electronic device.

16. The method of claim 13, wherein adjusting the position of the photocell array includes adjusting a carriage on which the photocell array is disposed.

17. The method of claim 13, further comprising:

adjusting a position of the light cell array to align with the photocell array based on the measured overlap.

18. The method of claim 17, wherein adjusting the position of the light cell array includes adjusting a carriage on which the light cell array is disposed.

* * * * *